United States Patent [19]

Nakano

[11] 4,443,083
[45] Apr. 17, 1984

[54] DRIVING APPARATUS IN A CAMERA

[75] Inventor: Yoshiyuki Nakano, Tokyo, Japan

[73] Assignee: Nippon Kogaku K.K., Tokyo, Japan

[21] Appl. No.: 357,813

[22] Filed: Mar. 15, 1982

[30] Foreign Application Priority Data

Mar. 19, 1981 [JP] Japan .................................. 56-40190
Mar. 19, 1981 [JP] Japan .................................. 56-40191

[51] Int. Cl.³ ............................................ G03B 19/12
[52] U.S. Cl. ................................ 354/152; 354/173.11; 354/271.1
[58] Field of Search ............... 354/152, 153, 270, 271, 354/173

[56] References Cited

U.S. PATENT DOCUMENTS

| | | | |
|---|---|---|---|
| 3,854,811 | 12/1974 | Araki | 354/153 |
| 4,173,403 | 11/1979 | Ueda et al. | 354/152 |
| 4,194,820 | 3/1980 | Nakano et al. | 354/271 X |
| 4,264,171 | 4/1981 | Hahn et al. | 354/152 |

FOREIGN PATENT DOCUMENTS

5099731 12/1973 Japan .
51-17908 5/1976 Japan .

*Primary Examiner*—John Gonzales
*Attorney, Agent, or Firm*—Wegner & Bretschneider

[57] ABSTRACT

In a single lens reflex camera having a reflecting mirror provided across the light path of a light beam travelling toward a film surface past the stop of a phototaking lens so as to be retractable from the light path, an apparatus for driving the stop device of the phototaking lens for the control of the stop to a predetermined aperture value and the reflecting mirror in relation to the exposure to the film surface includes stop-down operating means capable of being coupled to the stop device and displaceable between a first position for providing a maximum aperture opening to said stop and a second position for providing a minimum aperture diameter to said stop, moving means having a first moving area capable of moving forward while imparting the displacement from the first position to the second position to the stop-down operating means and moving backward while imparting the displacement from the second position to the first position to the stop-down operating means and a second moving area continuous to the first moving area and capable of moving while maintaining the stop-down operating means in the second position, and drive means for moving the moving means forward in the first moving area before the exposure to the film surface and subsequently moving the moving means in the second area. The drive means includes means for driving the reflecting mirror for said retraction while the moving means is in the second moving area.

12 Claims, 4 Drawing Figures

DRIVING APPARATUS IN A CAMERA

BACKGROUND OF THE INVENTION

1. Field of the Invention

This invention relates to a driving apparatus in a camera, and more particularly to a stop and/or mirror driving apparatus in a single lens reflex camera.

2. Description of the Prior Art

In single lens reflex cameras having an aperture control device of the type in which metering is effected while the aperture of the lens is stopped down and the stop-down is discontinued at a point of time whereat a metering value corresponding to a desired aperture has been reached, either a system whereby the aperture diameter is determined with a reflecting mirror remaining in the object observation position or a system whereby the aperture diameter is determined after the reflecting mirror has been retracted from the phototaking light path is conceivable.

In the former, the light to the metering system may reach a light-receiving element via the reflecting mirror and in the latter, metering may be accomplished by utilization of the reflection of the forward shutter curtain or the like. In the former type, the reflecting mirror must be moved up after the aperture diameter has been determined. Therefore, there is a system designed such that, as shown in Japanese Laid-open Patent Application No. 99731/1975 (a first prior art), the restraint of the reflecting mirror is released after lapse of a predetermined time from the operation of a stop restraining electromagnet, and a system as shown in Japanese Patent Publication No. 17908/1976 (a second prior art) wherein a timer is started by the release operation of the camera and the restraint of the reflecting mirror is released by an electromagnetic device when a sufficient time required for stop-down to be completed has elapsed, and in an example shown in U.S. Pat. No. 4,173,403 (a third prior art), the start of upward movement of the reflecting mirror is delayed by the use of a mechanical delay device.

As regards the first prior art, if the delaying operation is started by an electrical signal commanding the operation of the electromagnet, an electromagnetic device will be required for releasing the restraint of the reflecting mirror and this will lead to complexity and increased cost. Also, if a system is adopted whereby the displacement of the member caused by operation of the electromagnet to start a mechanical delay device, the capacity burden of this electromagnet will be great and this will be great and this will lead to bulkiness of the electromagnet and an increase in consumed electric current and further, the mechanical delay device must always quickly return to its original position so as to become ready for the next operation when the camera is continuously operated, and the mechanism for satisfying this will become complex. These disadvantages also hold true of the second and third prior arts.

Further, in the first prior art, the time from after the camera has been released until the electromagnet is operated differs depending on the set value of the aperture and necessarily, the timing for the start of upward movement of the reflecting mirror and the operation of the shutter fluctuates and thus, the photographer cannot exactly grasp the shutter chance.

On the other hand, in the trend of automation of photography, there is seen a tendency to contain a motor within a camera and seek after compactness and simplification of the camera. If, at such time, the above-described mechanism is intactly used, compactness and simplification of the camera will be greatly hampered. Accordingly, there is a demand for an aperture control device of rational construction which makes the best use of the merit that the motor is contained within the camera.

Furthermore, in an aperture control type single lens reflex camera, there is required an apparatus for resetting the stop restraining device responsive to shutter release operation and operated for aperture control. As a first example of the conventional resetting apparatus, there is one in which the resetting of the restraining device is effected during or after the aperture opening operation of returning the aperture to an open aperture value which takes place after completion of exposure. In this apparatus, a member to restrained by the stop restraining device and a member directly operatively associated with the opening-closing of the stop are separated from each other, thereby enabling the aperture opening operation before the resetting of the stop restraining device. However, these two members are designed to operate as a unit during the aperture control operation and this necessarily leads to an increased number of parts and complication of the mechanism.

As a second example of the conventional resetting apparatus, there is one in which the stop restraining device is reset by a resetting member operatively associated with the completion of exposure, and more particularly with the operation of the rearward shutter blade driving mechanism, whereafter the aperture opening operation is effected.

This does not have the above-noted disadvantages but instead has the following disadvantages. Due partly to the technical advancement that the movement energy has been reduced by the lighter weight of the shutter blade or curtain, the driving energy of the driving mechanism has been made small with a result that if the resetting member is operatively associated with the initial stage of operation of the driving mechanism, shutter movement will become unstable and irregularity of shutter time will be caused. On the other hand, if the resetting member is operatively associated with the vicinity of the termination of operation of the driving mechanism, unsatisfactory closing of the shutter will be liable to occur perticularly in cold northern districts and there will be a tendency that the resetting of the stop restraining device becomes unreliable.

SUMMARY OF THE INVENTION

The present invention has, for its object, to provide a driving apparatus in a camera, and more particularly improvements in a stop and/or mirror driving apparatus for a single lens reflex camera capable of automatic aperture control. The apparatus of the present invention includes drive means for driving a stop and a mirror, and a stop driving system and a mirror driving system are parallel-driven by the drive means. The stop driving system includes stop-down operating means capable of being coupled to the stop device of a phototaking lens and displaceable between a first position for providing a maximum aperture opening to said stop and a second position for providing a minimum aperture opening to said stop, and moving means capable of being coupled to the stop-down operating means and having a first moving area capable of moving while imparting said displacement to the stop-down operating means and a second moving area continuous to the first moving area and capable of moving while maintaining the stop-down operating means in the second position. The drive means drives, before the operation of exposure to a film, the stop driving system for successive movement of the moving means in the first and second moving areas and the mirror driving system for movement of the reflecting mirror for retraction from the phototaking light path while the moving means is in the second moving area. Further, the drive means drives, after completion of exposure, the stop driving system for successively moving the moving means in the second and first moving areas and the mirror driving system for return of the reflecting mirror while the moving means is in the second moving area. Such construction of the present invention enables low torque and high-speed control with respect to the drive means by the time-serial control of the stop driving system and the mirror driving system, and improves the energy efficiency.

The apparatus of the present invention further includes means for restraining the stop-down operating means when the aperture value being varied by being stopped down for the automatic control of the aperture has reached a predetermined value, and preferably further includes means for resetting the restraining means from the restraint of the stop-down operating means while the moving means is in the second moving area after completion of exposure.

In the present invention, the drive means may preferably include an electric motor which is designed to rotate in normal direction for said driving before the exposure and to effect a first reverse rotation for the driving after completion of the exposure, and then effect a second reverse rotation to drive a shutter charge device and/or a film advance device.

The invention will become more fully apparent from the following detailed description thereof taken in conjunction with the accompanying drawings.

DESCRIPTION OF THE PREFERRED EMBODIMENTS

The invention will hereinafter be described with reference to the drawings which show some embodiments thereof.

Figure 1:
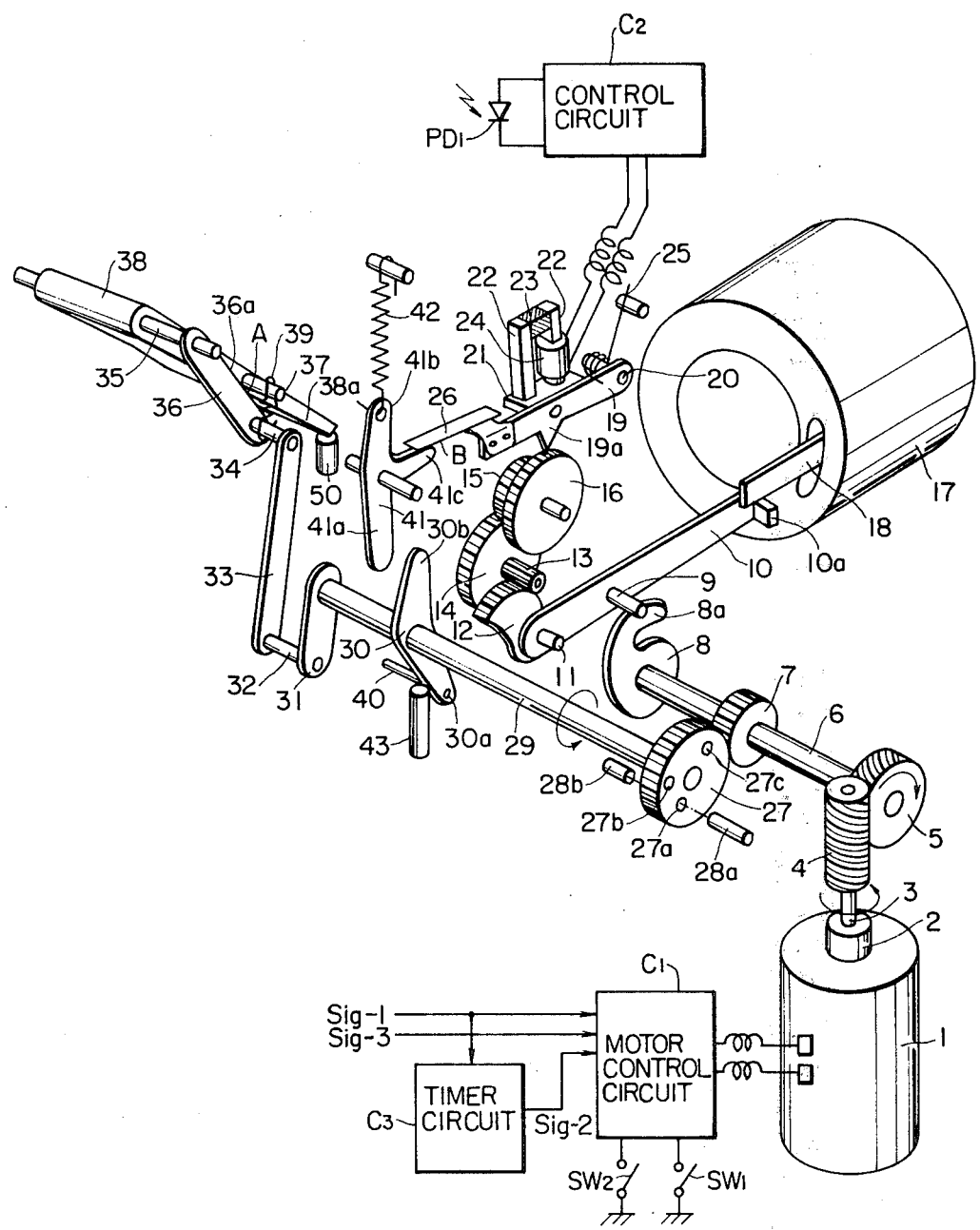
FIG. 1 is a perspective view showing a first embodiment of the present invention.

Referring to FIG. 1, a conventional slip mechanism 2 acts so as not to apply a burden to a motor 1 by slipping when an abnormal load is applied to the motor 1. The rotational force of the motor 1 is transmitted to the rotary shaft 3 thereof through the slip mechanism 2. A worm 4 secured to the shaft 3 is normally in mesh engagement with a worm wheel 5 and performs a decelerating action. When the shaft 3 is rotated counter-clockwise as viewed in the figure, the worm wheel 5 is rotated clockwise.

A shaft 6 is secured to the worm wheel 5 and has a first gear 7 secured to the central portion thereof and a stop-down cam 8 secured to the end thereof. A pin 9 bears against the stop-down cam 8. A stop-down lever 10 is pivotable about a shaft 11 and the pin 9 is secured to the intermediate portion of the lever 10. Accordingly, the lever 10 swings in response to the lift of the cam 8.

A sector gear 12 is secured coaxially and integrally with the lever 10. A pinion 13 is integral with a gear 14 and is normally in mesh engagement with the sector gear 12. The gear 14 is normally in mesh engagement with a pinion 15 which is rotatable with a ratchet wheel 16. Accordingly, the swinging movement of the lever 10 is enlarged and transmitted to the ratchet wheel 16.

Although not shown, a conventional stop mechanism is located within a lens 17. The stop is open when a stop interlocking lever 18 is in its position shown, and as the lever 18 is moved downward by the biasing force of a spring, not shown, the stop may be stopped down in accordance with the amount of movement of the lever 18. That is, the lever 18 is engaged with the end 10a of the lever 10 and therefore, as the lift of the cam 8 becomes smaller, the lever 10 is rotated clockwisely and the lever 18 is also moved downward as viewed in FIG. 1 and thus, the stop is stopped down.

A lever 19 is rotatably supported on a shaft 20 and counter-clockwise biased by a spring 25. The lever 19 has a pawl 19a which, when engaged with ratchet wheel 16, restrains the pivotal movement of the lever 10. In a normal condition, an armature 21 attached to the lever 19 is attracted to a yoke 22 and therefore, the lever 19 is not rotatable counter-clockwise. This attraction is by the magnetic force of a permanent magnet 23, but when electric power is supplied to a coil 24, the attraction of the permanent coil 23 is reduced and therefore, the armature 21 becomes disengaged from the yoke 22. As a result, the lever 19 is rotated counter-clockwise by the biasing force of the spring 25 and the pawl 19a comes into mesh engagement with the ratchet wheel 16. A plate spring 26 is attached to an end of the lever 19 and when this spring 26 is forced upward, the lever 19 is rotated clockwise and the armature 21 is again attracted.

A second gear 27 which is normally in mesh engagement with the first gear 7 is formed with three light-transmitting apertures 27a, 27b and 27c. Designated by 28a is a light-emitting element such as LED, and denoted by 28b is a photosensor. It is detected that the sensor 28b has become just opposed to one of the apertures 27a, 27b and 27c, and the detection signal is used for the sequence control.

A shaft 29 is secured to the second gear 27 and a reset lever 30 is secured to the intermediate portion of the shaft 29 and a crank 31 is secured to the end of the shaft 29. When the worm 4 is rotated counter-clockwise (the direction of arrow), the shaft 29 is also rotated counter-clockwise (the direction of arrow). A pin 32 is secured to the end of the crank 31 and one end of a rod 33 is rotatably supported on the pin 32.

The other end of the rod 33 is rotatably supported by a pin 34.

This pin 34 is secured to an end of a lever 36. The lever 36 which is integral with a shaft 35 is pivotable about the shaft 35. The above-described elements 29 and 31–36 together constitute lever crank mechanism. Accordingly, rotation of the shaft 29 in the direction of arrow causes upward movement of the rod 33 and counter-clockwise rotation of the lever 36.

A pin 37 is secured to a mirror holding frame 38 which is rotatably supported on the shaft 35. A reflex mirror (not shown) is attached to the holding frame 38 so as to reflect the light passed through the lens 17 toward a viewfinder optical system (not shown). A predetermined gap A is formed between one side of the lever 36 and the pin 37.

A tension spring 39 is extended between the pin 37 and the pin 34, so that the mirror holding frame 38 is biased clockwise (the direction in which the mirror is moved down). However, the downward movement of the frame 38 is limited to a position where the end 38a thereof is restrained by a cradle 50. When the lever 36 is rotated counter-clockwise by the rotation of the shaft 29 in the direction of arrow, the gap A is lost, whereafter the side 36a of the lever 36 bears against the pin 37 and as a result, the lever 36 and the mirror holding frame 38 are rotated counter-clockwise together with each other. Thus, the mirror holding frame 38 can retract from the phototaking light path.

Description will now be made of the function of the reset lever 30 secured to the intermediate portion of the shaft 29. A reset pin 40 is secured to an end 30a of the lever 30 and is in a positional relation in which it is engaged with a first arm 41a of a reset intermediate lever 41. A spring 42 is secured to a second arm 41b of the reset intermediate lever 41 and the second arm 41b is biased so that the lever 41 is returned to its initial position (the shown position) even if it is rotated in any direction. The lever 41 is also provided with a third arm 41c and in the shown position thereof, a predetermined gap B is formed between the third arm 41c and the plate spring 26. When the lever 41 is rotated counter-clockwise, the third arm 41c bears against the plate spring 26, and then rotates the lever 19 clockwise.

The other end 30b of the reset lever 30 is for limiting the rotation of the shaft 29 in the direction of arrow and this is accomplished by the end 30b bearing against a limit 43.

Operation will now be described.

FIG. 1 shows a position in which film advance and shutter charge of the camera have been terminated to complete the preparation for photography. When a release switch $SW_1$ is closed in response to depression of a release button, the motor 1 starts rotating counter-clockwise due to the action of a motor control circuit $C_1$. Thereupon, the shaft 6 begins to rotate clockwise through the agency of the worm 4 and the worm wheel 5. As a result, the cam 8 integral with the shaft 6 rotates in the same direction and the cam surface 8a of the cam 8 gradually reduced the lift relative to the pin 9. The lever 18 is rotated clockwise since it is downwardly biased as viewed in the figure.

The cam surface 8a is provided with such an inclination that there is obtained a minimum lift slightly smaller than the lift which provides a minimum aperture diameter to the lens 17, and is set so that the minimum lift follows in the subsequent rotation. This is called the minimum lift area. In a light-receiving element $PD_1$, the light passed through the lens 17 produces a photoelectric output corresponding to the stop-down. When the output of the light-receiving element $PD_1$ has come to correspond to a predetermined aperture value determined by film speed and shutter speed, a control circuit $C_2$ supplies electric power to the coil 24. Therefore, the attraction between the yoke 22 and the armature 21 is released and the pawl 19a comes into mesh engagement with the ratchet wheel 16 with a result that the lever 10 is restrained through the pinion 15, gear 14, pinion 13 and sector gear 12. Thus, a predetermined aperture value is set in the lens 17.

During such an aperture value determining operation, the second gear 27 in mesh engagement with the first gear 7 still continues to rotate counter-clockwise. Accordingly, the crank 31 also rotates in the same direction, so that the lever 36 starts rotating counter-clockwise. However, in the lever crank mechanism which is at the bottom dead center, the angle of rotation of the lever 36 is remarkably small as compared with the angle of rotation of the crank 31. Here it is to be understood that the gap A is determined so that the mirror holding frame 38 is not moved during the aforementioned aperture determining operation. Accordingly, during the aperture determining operation, upward movement of the mirror does not take place and therefore, the quantity of light entering the light-receiving element $PD_1$ is not adversely affected.

Such aperture determining operation takes the longest time in a case where the power supply to the coil 24 is not effected if the stop is not stopped down to the smallest aperture diameter of the lens 17 or other interchangeable lens group. The operation till now is such that the shaft 6 is rapidly rotated because the load applied to the motor is very small. However, in order that the aperture value determination may be accomplished with good accuracy, the lever 10 must be slowly rotated clockwise to some degree. It is because the pawl 19a must mesh with the ratchet wheel 16 at sufficiently stable timing for the response delay of the light-receiving element $PD_1$ and the control circuit $C_2$ and the operation delay of the coil 24. For this reason, the enlarging gear train between the gears 12–16 is endowed with a sufficiently great inertia. This, even if the cam 8 is rapidly rotated, the lever 10 is rotated at a suitable speed with a delay. Accordingly, when the cam 8 has arrived at the starting end of the minimum lift area, it waits with the rotation of the motor 1 stopped until the aperture value determining operation is terminated.

Rotation stop signal Sig-1 is produced upon detection of the fact that the aperture 27b formed in the second gear 27 has become just opposed to the sensor 28b. For example, from the time when the aperture 27a is just opposed to the sensor 28b (the aperture determining operation starting time) until the aperture 27b becomes just opposed to the sensor 28b, two pulse-like photoelectric outputs are obtained from the sensor 28b and therefore, these pulses may be counted. When the aperture 27b becomes just opposed to the sensor 28b, the rotation stop signal Sig-1 is sent to the circuit $C_1$ and as a result, electromagnetic brake is applied to the motor 1 to stop both the shaft 6 and the shaft 29. However, as previously mentioned, the mirror holding frame 38 does not yet operate due to the function of the gap A. What has been described above is the operation from the release till the aperture value determination.

Next, the upward movement stroke of the mirror is entered. When the aperture 27b becomes just opposed to the sensor 28b and the rotation stop signal Sig-1 is sent to the control circuit $C_1$, a timer circuit $C_3$ starts and a delay of the longest time of the times required for determining the minimum aperture diameter of all interchangeable lenses is effected, whereafter re-start signal Sig-2 is produced. When the signal Sig-2 is applied, the circuit $C_1$ supplies electric power to the motor 1. Accordingly, the motor 1 again starts rotating in the direction of arrow and the shafts 6 and 29 also start rotating.

With counter-clockwise rotation of the crank 31, the lever 36 continues to rotate counter-clockwise. At last, the gap A becomes zero and the side 36a of the lever 36 comes to bear against the pin 37 with a result that the mirror holding frame 38 is formed upward to retract from the phototaking light path. When the arm of the crank 31 faces substantially upwardly as viewed in the figure, the arm 30b of the reset lever 30 strikes against the limit 43, whereby the rotation of the shaft 29 is limited.

At this time, the aperture 27c formed in the second gear 27 becomes just opposed to the sensor 28b. When this is detected, re-stop signal Sig-3 is sent to the circuit $C_1$ to cut off the power supply to the motor 1. During the re-start of the motor 1, the cam 8 is rotated but the lever 10 is not rotated because of the minimum lift area. When the motor 1 is stopped, the termination end of the minimum lift area is reached. In this process, the reset pin 40 comes to bear against the first arm 41a of the reset intermediate lever 41 to rotate it clockwise, but when the first arm 41a passes the reset pin, the intermediate lever 41 is returned to its shown position by the biasing force of the spring 42. In this manner, the stop is stopped down, whereafter the mirror is moved up.

Thereafter, an unshown shutter starts operating. This start signal may be the re-stop signal Sig-3 produced by the aperture 27c of the second gear 27 and the sensor 28b, or a mechanical signal associated with the movement of the mirror holding frame 38 and lever 36.

When closing of the shutter is completed, the circuit $C_1$ is operated by a conventional method, for example, by the ON signal of a switch $SW_2$ associated with a rearward shutter blade driving mechanism, to thereby rotate the motor 1 in the direction opposite to the direction of arrow indicated in the figure. Next comes the mirror downward movement and stop opening operation stroke.

At this time, a film feeding system may be mounted on the shaft 3 of the motor 1 through a one-way clutch so that the film may be wound up by an amount corresponding to one frame simultaneously with the return of the mirror and the stop. Alternatively, a clutch which is capable of selectively changing over the transmission of power to the worm 4 and the transmission of power to the film feeding system may be provided on the shaft 3 so that the film may be wound up after the return of the mirror to its original position and the opening of the stop have been accomplished.

Now, when the shaft 3 of the motor 1 starts rotating clockwise, the shaft 6 starts rotating counter-clockwise through the agency of the worm 4 and the worm wheel 5. Accordingly, the cam 8 begins to rotate counter-clockwise from the termination end of the minimum lift area, but since the cam surface 8a is in the minimum lift, it does not immediately act on the pin 9, namely, the lever 10. On the other hand, the first gear 7 also starts rotating with the shaft 6 and therefore, the second gear 27 is also rotated clockwise. Accordingly, by the reverse rotation of the crank 31, the lever 36 and the mirror holding frame 38, the mirror is moved downward.

In mid course, the reset pin 40 provided on the reset lever 30 becomes engaged with the first arm 41a of the reset intermediate lever 41 to rotate this lever 41 counter-clockwisely. Therefore, the third arm 41c of the lever 41 forces the plate spring 26 upwardly with a result that the lever 19 is rotated clockwise and the armature 21 is urged against the yoke 22 and they are attracted to each other by the magnetic force of the permanent magnet 23. Accordingly, the engagement between the pawl 19a and the ratchet wheel 16 is released to permit free movement of the enlarging gear train of gears 12-16 and the lever 10.

On the other hand, as the reverse rotation of the crank 31 progresses and the end 38a of the mirror holding frame 38 bears against the cradle 50, the frame 38 cannot rotate any more. Accordingly, the lever 36 continues to rotate clockwise while pulling the spring 39 and thus, the gap A is again formed. At this time, the cam 8 passes the starting end of the minimum lift area and the lift begins to gradually become greater, and the lever 18 is displaced upward as viewed in the figure through the agency of the lever 10. Accordingly, the aperture of the lens 17 becomes open. As the motor 1 further continues to rotate, one end 30a of the reset lever 30 strikes against the limit 43, whereupon the shafts 29 and 6 stop rotating.

Now, in the case of a construction wherein film feeding is effected during the above-described operation, it is detected that the aperture 27a in the second gear 27 becomes again just opposed to the sensor 28b, whereupon the motor 1 is stopped. In a case where film feeding is effected after the above-described operation, the return of the shaft 6 to its original phase may be detected to change over the aforementioned clutch to the film feeding side.

In this manner, the mirror returns to the object observation position and the aperture of the lens 17 becomes open and the stop restraining device 16-25 also returns to its original position.

The operations of the reset pin 40 and the reset intermediate lever 41 will now be supplementally explained.

Figure 2:
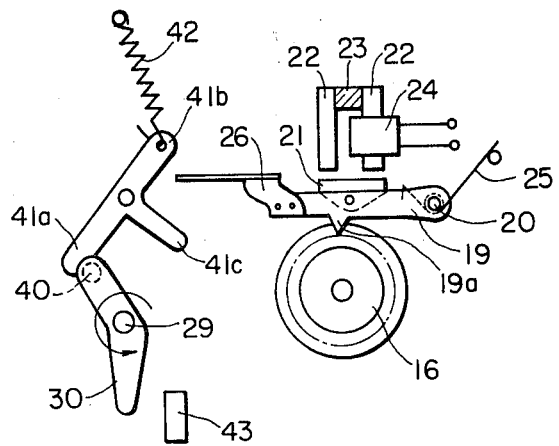
FIGS. 2 and 3 are side views showing the operation of the stop-down restraining portion during the upward movement operation and downward movement operation, respectively, of the reflecting mirror.

FIG. 2 shows a state in which the mirror is being moved up and the shaft 29 is being rotated counter-clockwise (the direction of arrow). At this time, the reset pin 40 bears against the reset intermediate lever 41 and the shaft 29 is rotated further from its shown position and therefore, the pin 40 passes the lever 41 and the reset intermediate lever 41 is returned to its initial position by the biasing force of the spring 42. At this time, it never happens that the engagement between the pawl 19a and the ratchet wheel 16 is released due to the action of the gap B.

Figure 3:
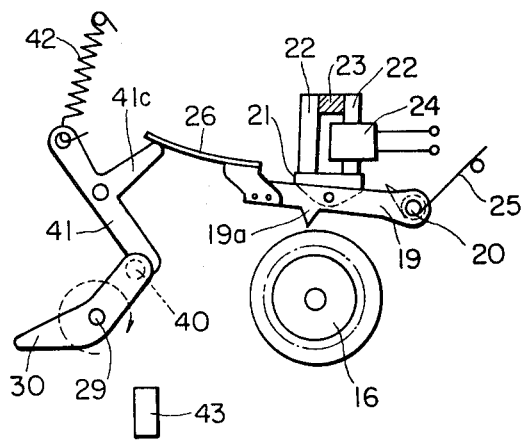

FIG. 3 shows a state in which the mirror is being moved down. In this case, the reset intermediate lever 41 is rotated counter-clockwise by the pin 40 and the third arm 41c pushes and flexes the plate spring 26 with a result that the armature 21 is attracted to the yoke 22. Thereafter, the shaft 29 further continues to rotate counter-clockwise and therefore, the pin 40 slips away from the lever 41. Accordingly, the lever 41 is returned to its initial position by the biasing force of the spring 42 and the third arm 41c becomes disengaged from the plate spring 26. If, thereafter, electric power is supplied to the coil 24, the lever 19 will become ready to rotate counter-clockwise.

Summing up the above-described embodiment, the start of stop-down is effected by the starting of the motor and the motor is temporally stopped until the aperture is determined and after the predetermined delay by the timer circuit, the motor is re-started, and a light switch is used for the control of the motor and the timer circuit.

In the present embodiment, the motor used as the drive source may of course be replaced by a spring device as used for a conventional quick return mirror, namely, a spring device whose direction of biasing force can be changed to a first direction and then to a second direction.

A second embodiment of the present invention will now be described. The first embodiment has been simple in mechanism, but if the voltage applied to the motor 1 is increased to shorten the photographing interval and widen the shutter chance, it will become impossible to stop the motor 1 suddenly. Accordingly, the pause between the stop-down operation and the mirror upward moving operation will become uncertain, so that upward movement of the mirror will be started by overrun and the quantity of light reaching the light-receiving element may become inaccurate.

For this reason, the second embodiment is constructed such that the driving system for the mirror is mechanically restrained and operation of the mirror driving system is again permitted at a predetermined timing. The mechanism for moving the mirror upwardly may also be similar to that used in the first embodiment, but herein another example is shown as being used. The construction thereof is common in many points to the first embodiment (similar reference numerals designate functionally similar members) and therefore need not be described in detail, but will be successively explained in the description of the operation thereof.

Figure 4:
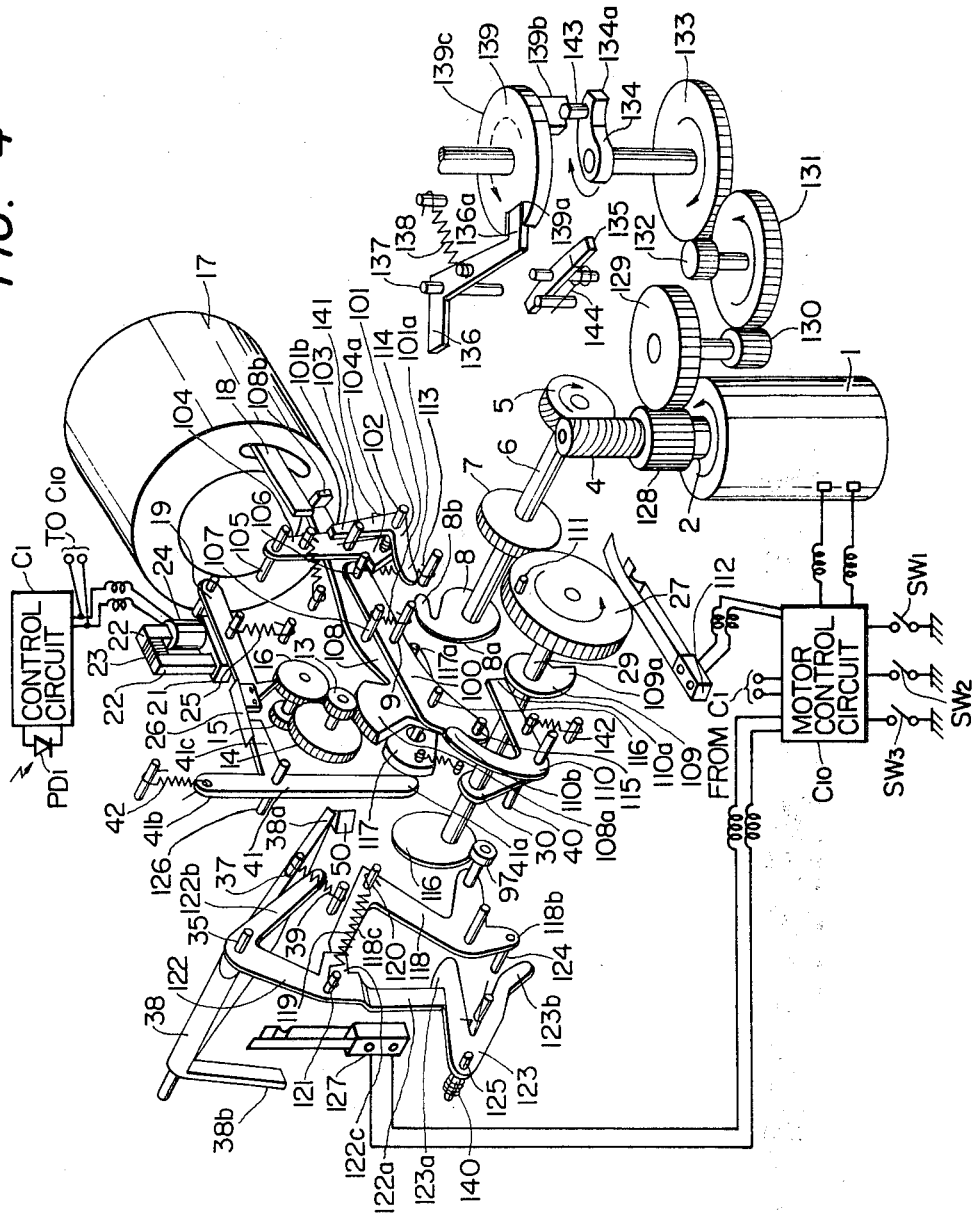
FIG. 4 is a perspective view showing a second embodiment of the present invention.

FIG. 4 illustrates the second embodiment and shows a case where the preparation for photography has been completed. When a release switch SW$_1$ is closed, the shaft of the motor 1 begins to rotate counter-clockwise (the direction of arrow) and the worm wheel 5 is rotated clockwise (the direction of arrow) through the agency of the worm 4. Further, the cam 8 is also rotated in the same direction through the agency of the shaft 6.

A projection 8b is formed at the end of the cam 8 and during clockwise rotation, this projection pushes one end 101a of a lever 101. Therefore, the lever 101 should begin to rotate counter-clockwise about a shaft 102 studded in a hook 104, but since the other end 101b of the lever 101 is held down by a pin 103, the entire hook 104 to which the shaft 102 is attached is rotated counter-clockwise about a shaft 105. Accordingly, the engagement between a hook portion 104a and a pin 106 is released. Also, a lever 100 becomes clockwise rotatable by the cam surface 8a of the cam 8.

On the other hand, the lever 100 is biased clockwise about a shaft 116 by a spring 113, and a spring 114 is extended between and secured to pins 9 and 107 studded in levers 100 and 108, respectively. Thus, the levers 100 and 108 are rotatable together with each other. The end 108b of the lever 108 is in enagagement with the lever 18 and subjected to the downward biasing force imparted to the lever 18 by a spring contained in the lens 17. Accordingly, the lever 100 begins to rotate clockwise by the hook portion 104a being disengaged from the pin 106. The rotational speeds of the levers 100 and 108 are suppressed to slow speeds by an inertia brake 117 to obtain aperture value determination accuracy. This inertia brake 117 is rotatably supported by a shaft 116, and a pin 117a studded in the inertia brake 117 is in engagement with the lower end of the lever 100. Therefore, the contact pressure between the cam surface 8a and the pin 9 is reduced to a very slight value or zero and thus, the shaft 6 rotates rapidly.

On the other hand, the first gear 7 provided on the intermediate portion of the shaft 6 is in mesh engagement with the second gear 27 and therefore, the shaft 29 is also rotated counter-clockwise. However, the projection 109a of a cam 109 secured to the intermediate portion of the shaft 29 is restrained by the end 110a of a lever 110 and therefore, rotation of the shafts 29 and 6 is stopped. In this case, a pin 111 provided on the second gear 27 closes a switch 112, so that the power supply to the motor 1 is cut off by the action of a motor control circuit C$_{10}$ and the motor 1 is stopped. However, since a slip mechanism 2 intervenes between the motor 1 and the shaft 3, it is not always necessary to cut off the power supply to the motor 1, but the starting of the next stroke can be quickened with the motor 1 remaining running when the shafts 6 and 29 are stopped.

Now, the clockwise rotation of the lever 100 is continued in the meantime and the aperture of the lens 17 gradually becomes smaller in diameter. The light passed through the lens is reflected by an unshown mirror and reaches the light-receiving element PD$_1$. When the photoelectric output of the light-receiving element PD$_1$ has assumed a predetermined relation with film speed and shutter speed, or when the photoelectric output has come to correspond to a desired aperture value, the control circuit C$_2$ supplies power to the coil 24. At this time, the magnetic force of the permanent magnet 23 is decreased and the attraction between the armature 21 and the yoke 22 is released by the biasing force of the spring 25. Accordingly, the lever 19 to which the armature 21 is attached to rotated counter-clockwise and the pawl at the end thereof restrains the ratchet wheel 16. As a result, the ratchet wheel 16 and the enlarging gear train 13–16, 108a connected thereto and the lever 108 are stopped. Thus, the aperture value of the lens 17 has been determined.

The enlarging gear train transmits to the pinion 13, gear 14, pinion 15 and ratchet wheel 16 the rotation created in a sector gear 108a formed in the base of the lever 108, thereby enlarging the angle of rotation of the lever 108. Accordingly, the stop error created when the ratchet wheel 16 is restrained by the pawl 19a is very small if converted into the aperture value of the lens 17.

Now, the power supply signal to the coil 24 is applied to the motor control circuit C$_{10}$ at the same time. By this, the power supply to the motor 1 is re-started, but due to the engagement between the cam 109 and the lever 110, the shafts 6 and 29 cannot yet rotate. After the lever 108 has been restrained, only the lever 100 continues to rotate clockwise by the biasing force of a spring 113 and the pin 9 overcomes the tension of a spring 114 and comes to bear against the minimum lift area of the cam surface 8. Immediately before this, a pin 115 studded in the other end of the lever 100 pushes the other arm 110b of the lever 110 upward to the left. Therefore, the lever 100 is rotated counter-clockwisely, so that the engagement between one end 110a and the projection 109a of the cam 109 is released and the shafts 29 and 6 re-start rotating counter-clockwise.

As regards the fact that the re-starting of the power supply to the motor 1 is effected simultaneously with the power supply to the coil 24, said re-starting may be associated with the counter-clockwise rotation of the lever 110. Of course, where a system wherein the power supply is not interrupted as previously mentioned is adopted. The procedure for the re-starting would be unnecessary.

Now, when the shafts 6 and 29 thus again begin to rotate, the cam 8 is in the minimum lift area in the subsequent phase and the aperture of the lens 17 does not again become open. On the other hand, when the cam 8 enters the minimum lift area, the lift of a charge cam 116 secured to the shaft 29 begins to become great and rotates a lever 118 clockwise through the agency of a roller 97. Therefore, a spring 119 is charged by a pin 120 studded in the lever 118. At this time, a pin 121 is pulled by the spring 119, but since one end 122a of a lever 122 to which the pin 121 is attached is restrained by the hook 123a of a lever 123, the lever 122 is not rotated counter-clockwise at this point of time.

When the rotation of the motor 1 progresses and the lift of the cam 116 becomes great, a pin 124 provided on the lever 118 pushes one end 123b of the lever 123, so that the lever 123 is rotated clockwise about a shaft 125 and the hook 123a releases its restraint of the lever 122. Accordingly, the lever 122 is rotated counter-clockwise by the biasing force of a spring 119 and the arm 122b of the lever 122 urges the pin 37 studded in the mirror holding frame 38. Therefore, the mirror holding frame 38 is rotated counter-clockwise about the shaft 35 and a mirror, not shown, is moved up therewith and retracts from the phototaking light path. The shaft 35 is integral with the lever 122 and rotatable relative to the mirror holding frame 38. In this process, a reset pin 40 secured to the lever 30 provided on the intermediate portion of the shaft 29 rotates the first arm 41a of the reset intermediate lever 41 clockwise about a shaft 126 with the rotation of the shaft 29. After the pin 40 has passed the first arm 41a, it is returned to its shown position by the biasing force of the spring 42.

The mirror holding frame is provided with an arm 38b and, when the mirror has been sufficiently moved up, a switch 127 is closed to cut off the power supply to the motor 1. The position in which the mirror has been sufficiently moved up is the following position. A film feeding lever 134 integral with a gear 133 is provided at the end of a reduction gear train comprising a pinion 128 overlying the slip mechanism 2 of the motor 1 and integral with the worm 4, a gear 129, a pinion 130, a gear 131, a pinion 132 and a gear 133. The time when the end 134a of the lever 134 has been restrained by a lever 135 is the position in which the upward movement of the mirror has been completed and, at this time, the shafts 6 and 29 do not rotate any more. In the above-described manner, the aperture value is first determined, and then the stroke in which the mirror is moved up is terminated.

Subsequently, the shutter operation is entered. The starting of the shutter may be accomplished either by electromagnetic means using the signal of the switch 127 or by a mechanical signal obtained from counter-clockwise rotation of the lever 122. Thereafter, exposure is effected for a predetermined exposure time and, when the exposure is completed, the motor 1 is rotated clockwise by the ON signal of a switch SW$_2$ associated with the rearward shutter blade driving mechanism. In association with the reverse rotation of the motor 1 or with the exposure completing operation, a lever 136 is rotated clockwise about a shaft 137 against the force of a spring 138. Thereupon, the engagement between the cut-away portion 139a of a film feeding plate 139 and the end 136a of the lever 136 is released. With the reverse rotation of the motor 1, the shafts 6 and 29 are rotated in the direction opposite to the direction in which they have so far been rotated. Thus, the lift of the cam 116 becomes smaller and therefore, the lever 118 is rotated counter-clockwise. Thereupon, the mirror holding frame 38 and the lever 122 are rotated clockwise by the biasing force of the spring 39 because one end 118c of the lever 118 bears against one end 122a of the lever 122 by the biasing force of the spring 119.

Accordingly, the end 38a of the mirror holding frame 38 strikes against the cradle 50 and is thereby stopped from rotating and thus, the unshown mirror is returned to the object observation position. At the same time, the end 122a of the lever 122 pushes away the hook 123a of the lever 123 and rotates clockwise. Since a spring 140 biases the lever 123 counter-clockwise, the hook 123a restrains one end 122a of the lever 122, which thus becomes unrotatable counter-clockwise.

In the meantime, the third arm 41c pushes the plate spring 26 upward in order that the pin 40 at the end of the reset lever 30 may rotate the first arm 41a of the reset intermediate lever 41 counter-clockwise. Therefore, the lever 19 is rotated righthandedly and the armature 21 is attracted to the yoke 22. Accordingly, the engagement between the pawl 19a and the ratchet wheel 16 is released, so that the enlarging gear train from the ratchet wheel 16 to the lever 108 is permitted to rotate. Further, the cam surface 8a pushes the pin 9 upward by the counter-clockwise rotation of the shaft 6. The cam surface 8a also bears against one end 101a of the lever 101 and rotates the lever 101 clockwise against the force of a spring 141.

When the lever 100 returns to its position of FIG. 4, the pin 106 is restrained by the hook portion 104a and therefore, even if the cam 8 is rotated counter-clockwise thereafter, the lens 17 will not be stopped down. Since the projection 109a can ride over one end 110a of the lever 110 against the force of a spring 142, the shaft 29 can also be rotated clockwise.

Even if the cam 116 further continues to rotate and the lever 118 is rotated clockwise, the hook 123a of the lever 123 restrains the end 122a of the lever 122 and therefore, the mirror is not moved. Thus, the mirror is returned to its initial position and the aperture becomes open.

As a result of the above-described reverse rotation of the motor 1, the film feeding lever 134 which has been rotated during the normal rotation of the motor until it bears against the lever 135 returns to its shown position. Thereupon, a pin 143 studded in the end 134a of the lever 134 bears against the lower projection 139b of a film feeding plate 139 and therefore, these begin to rotate counter-clockwise (the direction of broken-line arrow) together with each other. As unshown film feeding mechanism and an unshown shutter charge mechanism are operatively associated with the film feeding plate 139 so that during the time the film feeding plate 139 makes one full rotation, the film is fed by an amount corresponding to one frame and shutter charge is effected.

On the other hand, in the course of the shutter charge, the righthanded bias imparted to the lever 136 is eliminated and the lever 136 is caused to bear against the outer peripheral portion 139c of the film feeding plate 139 by the biasing force of a spring 138. Accordingly, after the film feeding plate 139 has made one full rotation, the end 136a drops into a cut-away portion 139a, so that the film feeding plate 139 is stopped and both of the shaft 6 and the shaft 29 are also stopped. At this time, cutting off the power supply to the motor 1 can be readily accomplished by closing a switch SW$_3$ by utilizing the drop of the lever 136 into the cut-away 139a.

In this film feeding stroke, the film feeding lever 134 bears against the lever 135 during the rotation thereof in the direction of broken-line arrow, but it can pass while pushing away the lever against the force of a spring 144 and therefore, no problem occurs.

As described above, in the second embodiment, mechanical restraint is effected during the time from after stop-down until upward movement of the mirror is started and further, mechanical delay is effected to enable the aperture to be reliably determined. Accordingly, even in a case where the driving power source is of a high voltage or where voltage fluctuation is great, stable aperture control can be accomplished.

Where the aperture value controlled in the present apparatus is great and where said aperture value is small, the magnitude of the force which drives the lever 100 is varied. That is, where the aperture value is set to a great aperture, the biasing force supplied from the lever 18, of the force which drives the lever 100, is early lost due to the stoppage of the lever 108 and conversely, where the aperture value is set to a small aperture, said biasing force is applied for a long time. Therefore, in the case of a small aperture, the engagement between the cam 109 and the lever 110 is released earlier. Generally, however, the biasing force of the lever 18 is sufficiently small, whereas the force of the spring 113 and the force of the inertia brake 117 are great and therefore, the difference therebetween is virtually negligible.

In each of the embodiments hitherto described, the downward movement of the mirror and the release of the stop-down blocking are effected along with each other, whereas the present invention is not restricted thereto but the release of the stop-down blocking may be operatively associated either with the operation of the rearward shutter curtain driving mechanism at the completion of exposure or with the film wind-up for the next cycle of photography. In this case, design may be made such that, for example, the member 12-16 to be restrained by the pawl 19a in FIG. 1 is made separate from the stop-down lever 10 so that the two are operable together with each other during stop-down but the two are operable separately from each other during the opening of the aperture.

What is claimed is:

1. A single lens reflex camera having a reflecting mirror which moves during operation from a position across the light path of a light beam travelling toward a film surface past the stop of a phototaking lens to a position retracted from said light path, an apparatus for driving the stop of said phototaking lens for the control of said stop to a predetermined aperture value and for the control of the movement of said reflecting mirror and means for causing exposure of the film surface to the light beam passing the stop, said apparatus comprising:
   (a) stop-down operating means capable of being coupled to said stop and displaceable between a first position for providing a maximum aperture opening to said stop and a second position for providing a minimum aperture opening to said stop;
   (b) moving means having a first moving area capable of moving forward while imparting displacement from said first position to said second position to said stop-down operating means and moving backward while imparting displacement from said second position to said first position to said stop-down operating means, having a second moving area continuous with said first moving area and being capable of moving while maintaining said stop-down operating means in said second position; and
   (c) drive means for driving said moving means forward in said first moving area before the exposure of light to said film surface and subsequently driving said moving means into said second moving area, said drive means including means for retracting said reflecting mirror into said retracted position while said moving means is in said second moving area.

2. An apparatus according to claim 1, wherein said drive means drives said moving means in said second moving area after completion of the exposure of light to said film surface and subsequently drives said moving means backward in said first moving area and further comprises means for returning said reflecting mirror into said light path while said moving means is in said second moving area.

3. An apparatus according to claim 1, wherein said drive means includes timing adjusting means for moving said moving means in said second moving area after at least the time required for said stop to vary from the maximum aperture opening to the minimum aperture opening has elapsed after the forward movement in said first moving area.

4. An apparatus according to claim 3, wherein said timing adjusting means includes timer means adapted to start a time counting operation upon completion of the forward movement in said first moving area and to enable movement of said moving means in said second moving area after lapse of a predetermined time.

5. An apparatus according to claim 3, further including means for restraining the displacement of said stop-down operating means when said stop has assumed said predetermined aperture value and wherein said stop-down operating means includes a first member capable of being displaced over a predetermined stroke in response to said moving means, a second member displaceable between said first position and said second position in response to said first member, and means for adjusting the speed of displacement of said first member so that the displacement of said first member over said predetermined stroke is accomplished within said required time, said restraining means being capable of restraining the displacement of said second member, and said timing adjusting means being responsive to said first member.

6. An apparatus according to claim 5, wherein said timing adjusting means includes means for stopping the driving of said moving means by said drive means upon completion of the forward movement of said moving means in said first moving area, and means for releasing said stoppage in response to said first member.

7. In a camera, an apparatus for driving the stop of a phototaking lens for the control of the stop to a predetermined aperture value in conjunction with the exposure of a film surface within the camera to a light beam passing the stop of the lens, said apparatus including:
   (a) stop-down operating means capable of being coupled to said stop device and displaceable between a first position for providing a maximum aperture opening to said stop and a second position for providing a minimum aperture opening to said stop;
   (b) moving means having a first moving area capable of moving forward while imparting displacement from said first position to said second position to said stop-down operating means and moving backward while imparting displacement from said second position to said first position to said stop-down operating means, having a second moving area continuous with said first moving area and being capable of moving forward and backward while maintaining said stop-down operating means in said second position;

(c) means for restraining the displacement of said stop-down operating means when the stop of said phototaking lens, which varies in response to the displacement of said stop-down operating means from said first position to said second position, has assumed said predetermined aperture value;

(d) release means operable to release said restraining means; and (e) drive means for driving said moving means forward in said first moving area and said second moving area before the exposure to light of said film surface and driving said moving means backward in said second moving area and said first moving area after completion of said exposure, said drive means including means for operating said release means during the backward movement of said moving means in said second moving area.

8. An apparatus according to claim 7, wherein said release means includes a member displaced from an initial position to an operative position by said drive means to release said restraint, and means for biasing said member to said initial position.

9. A camera containing film and having a phototaking lens with a stop therein, capable of driving a film feed device for feeding one frame of said film after exposure of said film to a light beam which has passed through the stop of the phototaking lens and of controlling said stop to a predetermined aperture value in connection with making said exposure, said camera comprising:

(a) stop-down operating means capable of being coupled to said stop device and displaceable between a first position for providing a maximum aperture opening to said stop and a second position for providing a minimum aperture opening to said stop;

(b) rotative driving means having a rotating shaft and control means operatively engaged therewith for causing said rotative driving means to effect a first rotation of said rotating shaft in one direction before said exposure, a second rotation of said rotating shaft in the other direction in response to completion of said exposure, and a third rotation of said rotating shaft in said other direction subsequent to said second rotation;

(c) moving means for enabling the displacement of said stop-down operating means from said first position to said second position in response to the first rotation of said rotating shaft and enabling the displacement of said stop-down operating means from said second position to said first position in response to said second rotation of said rotating shaft; and (d) coupling means for enabling the feeding of said film by said feeding device in response to the third rotation of said rotating shaft, said coupling means including means for making said feeding device independent of the first and second rotations of said rotating shaft.

10. A camera having a displacing means operatively connected with automatic aperture controlling means and stop and mirror driving means therein which is displaced from a first position in which potential energy is stored to a second position in which in which the potential energy has been discharged, and having a means for holding the displacing means in the first position, in which in association with exposure of film in the camera to light passing through a lens on the camera the displacing means is operated by a device comprising:

moving means moving forward before exposure of a film and moving backward after the exposure wherein the moving means, upon the forward movement acts upon the holding means to release the displacing means from the holding means, and said moving means, upon the rearward movement, acts upon the displacing means to displace the displacing means to the first position while giving potential energy to the displacing means.

11. A camera according to claim 10, wherein said moving means includes cam means engaged with the displacing means, said cam means moving forward further after the displacing means has been released, thereby allowing the displacement of the displacing means from said first position to said second position.

12. A camera according to claim 10, wherein said holding means includes a first member for holding the displacing means, a second member adapted for displacement in a first direction and a second direction in response to the forward and and the rearward movements of a the moving means respectively and means for interlocking said second member with said first member, said interlocking means including means for displacing said first member in association with the displacement of said second member in said first direction and for displacing said first member independently from the displacement of the second member in said second direction.

* * * * *